United States Patent
Dunseath et al.

(10) Patent No.: US 10,874,209 B1
(45) Date of Patent: Dec. 29, 2020

(54) EXPANDABLE AND CONTRACTABLE SUSPENDED STORAGE DEVICE

(71) Applicant: Ceiling Storage and More Inc., Scottsdale, AZ (US)

(72) Inventors: Dwayne Dunseath, Las Vegas, NV (US); Dylan M. Dunseath, Las Vegas, NV (US); Gary Romig, Reading, PA (US); Jim Yacksyzn, Henderson, NV (US)

(73) Assignee: Ceiling Storage and More Inc., Scottsdale, AZ (US)

( * ) Notice: Subject to any disclaimer, the term of this patent is extended or adjusted under 35 U.S.C. 154(b) by 0 days.

(21) Appl. No.: 16/536,303

(22) Filed: Aug. 8, 2019

(51) Int. Cl.
| | |
|---|---|
| *A47B 57/06* | (2006.01) |
| *A47B 96/02* | (2006.01) |
| *B65G 1/02* | (2006.01) |
| *A47B 51/00* | (2006.01) |

(52) U.S. Cl.
CPC ............. *A47B 57/06* (2013.01); *A47B 51/00* (2013.01); *A47B 96/025* (2013.01); *B65G 1/026* (2013.01); *A47B 2051/005* (2013.01)

(58) Field of Classification Search
CPC ......... A47B 57/00; A47B 57/06; A47B 51/00; A47B 2051/005; A47B 96/025; A47B 46/00; A47B 46/005; B65G 1/026; A47F 3/06
See application file for complete search history.

(56) References Cited

U.S. PATENT DOCUMENTS

| | | | | |
|---|---|---|---|---|
| 593,445 | A * | 11/1897 | Toal | A47C 17/84 |
| | | | | 5/279.1 |
| 1,819,516 | A * | 8/1931 | Kelly | B60R 7/04 |
| | | | | 296/37.7 |
| 3,829,912 | A * | 8/1974 | Quakenbrush | A47C 17/84 |
| | | | | 5/10.2 |
| 7,802,840 | B1 * | 9/2010 | Shea | B62D 33/0612 |
| | | | | 296/190.02 |
| 9,737,140 | B2 * | 8/2017 | Bondi | A47B 51/00 |
| 2004/0123781 | A1 * | 7/2004 | D'Agostino | A47B 51/00 |
| | | | | 108/42 |

(Continued)

FOREIGN PATENT DOCUMENTS

WO  WO-2008080959 A2 *  7/2008 ............. A47B 57/06

*Primary Examiner* — Daniel J Rohrhoff
(74) *Attorney, Agent, or Firm* — Bayramoglu Law Offices LLC

(57) ABSTRACT

An expandable and contractable storage device comprised of a frame, X-bars, a leveler, a movable bar, rolling wheels and attachment guides. The frame includes at least one elongated support element having a support ledge. The leveler is connected to the moveable bar and a grooved shaft. The rolling wheels are attached to carriages and the movable bar are located inside elongated U-shaped channels and channels of the attachment guides. The X-bars are attached to the carriages and the attachment guides. Stoppers are movably located inside the elongated U-shaped channels and the channels of the attachment guides. The rotation of the leveler will rotate the grooved shaft and move the movable bar in a forward direction forcing the rolling wheels to rotate and translate forward along the channels and the X-bars will move in an upward or downward direction and the frame moves in a downward or upward direction.

18 Claims, 14 Drawing Sheets

(56) References Cited

U.S. PATENT DOCUMENTS

| | | | |
|---|---|---|---|
| 2008/0245755 A1* | 10/2008 | Carter | A47B 46/005 211/117 |
| 2009/0038240 A1* | 2/2009 | Leonard | E04B 1/34347 52/169.9 |
| 2015/0145393 A1* | 5/2015 | Young | A47B 46/005 312/246 |

* cited by examiner

EXPANDABLE AND CONTRACTABLE SUSPENDED STORAGE DEVICE

TECHNICAL FIELD

The present invention relates to the technical field of storage devices. More specifically, the present invention is a storage device which is suspended from a support structure and expands and contracts.

BACKGROUND

Many prior art suspended storages devices are not expandable or contractable and are placed in a location that is too high off the ground for a person to remove storage items from the suspended storage device or to place items onto the suspended storage device. Prior art storages devices are a fixed (i.e. non expandable or contractable) suspended storage device which is fixed to a ceiling. After installing this suspended storage device to the ceiling, the items in the suspended storage device are not accessible to a user without a latter or some other device which the user needs to climb up or onto in order to reach the items in the suspended storage device because the suspended storage device is too far above the floor for the user to reach his or her items. Therefore, a person requires the use of a latter or similar device to access the items stored in the suspended storage device and to place items to be stored in the suspended storage device. Furthermore, many hazards and accidents have occurred and continue to occur while climbing a latter with heavy and awkward storage items which are to be placed on or have been taken from the suspended storage device.

Therefore, Applicant has invented a storage device which solves the problem of placing storage items on and accessing storage items from the storage device without having to climb up a latter. Applicant's storage device allows a user to place storage items on and remove storage items from the storage device without having to climb up a latter by having the storage device expand and contract. Since Applicant's storage device expands and contracts, a user of the storage device is able to stand on the ground/floor (i.e. stand at ground/floor level) and place item(s) on the storage device and/or remove item(s) from the storage device without using a latter or any other similar device.

SUMMARY

An object of the present invention is to provide a storage device which solves the technical problems in the prior art that a latter is required to access the items stored in the suspended storage device and to place items to be stored in the suspended storage device.

The present invention is a storage device designed to be attached to a support structure, where the support structure is a roof, ceiling, joists or other similar supporting devices.

The storage device comprising a frame, wherein the frame comprises at least one elongated support element, a support platform connected to the frame and a means for lowering and raising the frame.

The means for lowering and raising the frame is a leveler, a linear actuator, a drive powered linear slide, a pulley and rope/cable system or a winch and rope/cable system. The winch system is a single winch provided with a hand crank/controller or a powered crank/controller, where the winch is located in the center (i.e. geometry center) of a bottom portion of the support structure. The leveler is a wheel, a drill, a wrench or other device which can apply a force to move or rotate an element which can lower and raise the frame of the storage device.

The storage device also includes X-bars, a leveler, a movable bar, rolling wheel(s) and two attachment guides (i.e. a first attachment guide and a second attachment guide). Each of the attachment guides is attached to the support structure and has a channel. The frame is comprised of at least one elongated support element, where each elongated support element has a support ledge. The elongated support elements are permanently attached or removable attached together and are attached together by a weld, screws, rivets or other fastening devices. The number of elongated support elements is preferably four but can be one or more. A support platform is placed on the support ledges. The support platform is comprised of one or more panels, where the panels are formed from a grid of support members. The support members are round or square or have a similar polygonal shape; are made of steel or aluminum or any other metal or a composite metal or a composite material; and may have a spacing/gap between the support members. The support platform is permanently attached or removable attached to the support ledges and are attached by a weld, screws, rivets or other fastening devices. The frame is rectangular or square or some other shape. The frame material is steel or aluminum or any other metal or a composite metal or a composite material that provides the ability/strength to hold a distributed weight (i.e. distributed across the support platform) capacity from a few pounds of weight up to 800 pounds of weight or even more than 800 pounds of weight in order to support the weight of a given or desired use of the storage device. The frame is approximately four feet in width by seven feet in length. However, the width and/or the length can be shorter or longer than the disclosed four foot width and the seven foot length in order to accommodate the storage device use within a desired location and to meet the required user needs of the quantity and size of the items to be stored. Also, folding legs, pivoting element(s) (i.e. a groove and pin/rod), are attached to the bottom of the frame and located at each of the corners of the frame in order to help support the load/weight of the storage items installed on the storage device.

The leveler is attached to a coupler and the coupler is connected to a bracket located on an underside of an elongated support element. The leveler is a wheel having a handle attached to an outer surface of the wheel. The handle is used to rotate the wheel in a clockwise and/or counter-clockwise direction. The coupler and the bracket both have an internal grooved hole therein and a grooved shaft is inserted into the grooved holes of the coupler and the bracket. The connection between the coupler and the bracket and the attachment of the bracket to the underside of the elongated support element can be any known connection, either permanently connected or removably connected, method of connecting two elements together such as a weld, screws, rivets, or other fastening devices. Additionally, the grooved shaft is inserted into a grooved aperture located within the movable bar and also is inserted into a grooved aperture located in a fitted bracket, where the fitted bracket is attached to an underside of an elongated support element. The attachment of the fitted bracket can be any known connection, either permanently connected or removably connected, method of connecting two elements together such as a weld, screws, rivets, or other fastening devices and methods. The elongated support element, which has the fitted bracket attached thereto, and the elongated support element, which has the bracket attached thereto, are located opposite to each other within the frame. Two of the elongated support elements have an elongated U-shaped channel attached to an outer surface. Preferably, the two elongated support elements having the elongated U-shaped channel attached are located between the elongated support elements which have the bracket and the fitted bracket attached thereto. At least one rolling wheel is attached to a carriage and the movable bar and the at least one rolling wheel is placed inside each of the elongated U-shaped channels and inside each of the channels of the attachment guides. It is preferable to have the at least one rolling wheel being two rolling wheels. However, more than two rolling wheels attached to the carriage and placed inside each of the elongated U-shaped channels and the channels of the attachment guides are applicable depending on the desired use of the storage device. The rolling wheel(s) preferably contain roller bearings. The carriage and movable bar have a hole or holes therein and the at least one rolling wheel is attached to the carriage via the hole(s) in the carriage.

Two pair of X-bars attach to the storage device. Each X-bar has a hole therein and the hole is located at the midpoint of the length of the bar. A screw, rivet, fastener or similar fastening device is installed into the holes of the X-bars in order to connect the X-bars together. The X-bars have the same length in order to keep the support platform level when lowering or raising the frame by rotating the leveler. The X-bars are flat bars. Alternatively, the X-bars can be tubular (i.e. circular) shaped or square shaped or any other polygonal shape. The X-bars are made from steel or aluminum or any other metal or a composite metal or a composite material. In one X-bar pair, one end of one of the X-bars is attached to the carriage (i.e. a first carriage) and the other end of the X-bar is attached to one of the attachment guides (i.e. a first attachment guide) and one end of the other X-bar is attached to an elongated support element and the other end of the other X-bar is attached to the one of the attachment guides (i.e. a first attachment guide). In the other pair of the two pair of the X-bars, one end of one X-bar is connected to a carriage (i.e. a second carriage) and the other end of the one X-bar is connected to the other attachment guide (i.e. a second attachment guide) and the other X-bar has one end connected to the at least one elongated support element and the other end of the other X-bar is connected to the other attachment guide (i.e. a second attachment guide). The attachment of the X-bars to the carriages (i.e. first carriage and second carriage) are attached in the same axial plane as the center of the at least one rolling wheel in order to prevent moment forces.

Also, a support X-bar or a pair of support X-bars can be attached to the same elongated support element which the fitted bracket is attached in order to reduce lateral forces and therefore reduce the frame from moving in a sideways direction. The support X-bar or the pair of support X-bars can be permanently attached or removable attached to the elongated support element by any known connection method of connecting two elements together such as a weld, screws, rivets, or other fastening devices and methods.

Furthermore, in combination or not in combination with the support X-bar or the pair of support X-bars, vertical alignment bars are positioned at each corner of the frame and are connected to the elongated support elements and the attachment guides. The vertical alignment bars are comprised of tubing, where the tubing has at least one opening at one end thereof. The vertical alignment bars are attached to each attachment guide and have an opening larger than the tubes' opening that are attached to the elongated support elements so the tubing attached to the elongated support elements fit inside the tubing attached to the attachment guides in order to prevent the frame from moving side to side during the lowering and raising of the frame. However, the size of the openings of the tubing may be opposite as disclosed above. Therefore, the tubing attached to the attachment guides may have an opening smaller than the tubes' opening attached to the elongated support elements so the tubing attached to the attachment guides fit inside the tubing attached to the elongated support elements. The tubing shape is circular shaped or square shaped or any other polygonal shape. The tubing is made from steel or aluminum or any other metal or a composite metal or a composite material. The attachment of the vertical alignment bars can be permanently attached or removable attached by any known connection method of connecting two elements together such as a weld, screws, rivets, or other fastening devices and methods.

The movable bar is positioned underneath two of the elongated support elements of the frame and has a grooved aperture therein and is attached to the carriages. The grooved aperture is located at the middle of the movable bars' length direction, wherein the length direction is perpendicular to the axis of the grooved shaft. The movable bar positioned underneath the elongated support elements is attached to the carriages by any known connection method of connecting two elements together such as a screws, rivets, or other fastening devices and methods.

A stopper is placed inside each of the elongated U-shaped channels and inside each channel of each of the attachment guides. The stopper is rigid and movable. The stopper has a hole therein and a screw is installed within the hole and is installed within a stopper hole located within the elongated U-shaped channels and inside each channel of each of the attachment guides. The stopper has a top surface, where one corner of the top surface is higher and is an upper corner which is higher than the other top surface which is a lower corner so as to allow easy removal of the stopper from the inside of the elongated U-shaped channels and the channels of the attachment guides. The lower corner of the top surface can be a rounded shape to provide easier rotation/insertion/removal into and out of the channels. Also, stopper has two rows of ridges to increase the rigidity of the stopper. The stopper being rigid prevents the stopper from being moved when contacted by the translating carriage. Also, the stopper being movable provides the flexibility of positioning the stopper at any location within the elongated U-shaped channels and the channels in the attachment guides so as to be able to change/design the length of the X-bars as needed while without having to change (i.e. keeping fixed) the length of the elongated support elements of the frame.

An alternative embodiment of the present invention is replacing the elongated U-shaped channels and rolling wheel(s) with V grooved wheel(s) housed inside square tubing, wherein the housing includes mounting plate(s), internal sleeves connecting the square tubing together and stop plates.

The operation of the storage device is disclosed below. When the leveler is rotated (for example by a handle), the moveable bar moves in a horizontal direction and forces the rolling wheel(s) attached to the carriages and the movable bar to move, which moves the X-bars, and this movement of the X-bars either lowers or raises the fame of the storage device. For example, if the leveler is rotated in a clockwise direction, this rotation will rotate the grooved shaft which forces the movable bar to move in a forward direction and forces the rolling wheel(s) to rotate and translate forward along the elongated U-shaped channels. Since the rolling wheel(s) is/are attached to the carriages and the carriages are fixed to at least one of the X-bars, the X-bars will move in an upward (i.e. vertical) direction and the frame of the storage device moves in a downward direction. The leveler is continued to be rotated (i.e. clockwise in this example) until the frame has been lowered to such a position that a user of the storage device can safely place items on or remove from the panel(s) of the platform of the storage device.

BRIEF DESCRIPTION OF THE DRAWINGS

In order to more clearly illustrate the embodiments of the present disclosure, a brief description of the drawings is given below. The following drawings are only illustrative of some of the embodiments of the present disclosure and for a person of ordinary skill in the art, other drawings or embodiments may be obtained from these drawings without inventive effort.

REFERENCE SIGNS

1—storage device; 2—support structure; 3—frame; 4—X-bar(s); 5—leveler; 6 handle; 7—movable bar; 8—elongated support element(s); 9—support ledge; 10—rolling wheel(s); 11—attachment guide(s); 12—channel(s); 13—panel(s); 14—support member; 15—coupler; 16—bracket; 17—grooved shaft; 18—grooved aperture; 19—fitted bracket; 20—elongated U-shaped channel(s); 21—carriage(s); 22—fastening device; 23—support X-bar(s); 24—vertical alignment bar(s); 25—opening(s); 26—stopper(s); 27—hole; 28—screw; 29—stopper hole; 30—top surface; 31—ridges; 32—winch; 33—folding legs; 34—pivoting element(s); 35—V-grooved wheel(s); 36—tubing; 37—mounting plate; 38—internal sleeve; 39—stop plate(s).

DETAILED DESCRIPTION

The technical solutions of the present disclosure will be clearly and completely described below with reference to the drawings. The embodiments described are only some of the embodiments of the present disclosure, rather than all of the embodiments. All other embodiments that are obtained by a person of ordinary skill in the art on the basis of the embodiments of the present disclosure without inventive effort shall be covered by the protective scope of the present disclosure.

In the description of the present disclosure, it is to be noted that the orientational or positional relation denoted by the terms such as "center", "upper", "lower", "left", "right", "vertical", "horizontal", "inner" and "outer" is based on the orientation or position relationship indicated by the figures, which only serves to facilitate describing the present disclosure and simplify the description, rather than indicating or suggesting that the device or element referred to must have a particular orientation, or is constructed or operated in a particular orientation, and therefore cannot be construed as a limitation on the present disclosure. In addition, the terms "first", "second" and "third" merely serve the purpose of description and should not be understood as an indication or implication of relative importance.

In the description of the present disclosure, it should be noted that unless otherwise explicitly specified and defined, the terms "install", "link" and "connect" shall be understood in the broadest sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skill in the art would understand the specific meaning of the terms in the present disclosure according to specific situations.

The present invention of a storage device which expands and contracts is described in detail below in reference to the figures.

Figure 1:
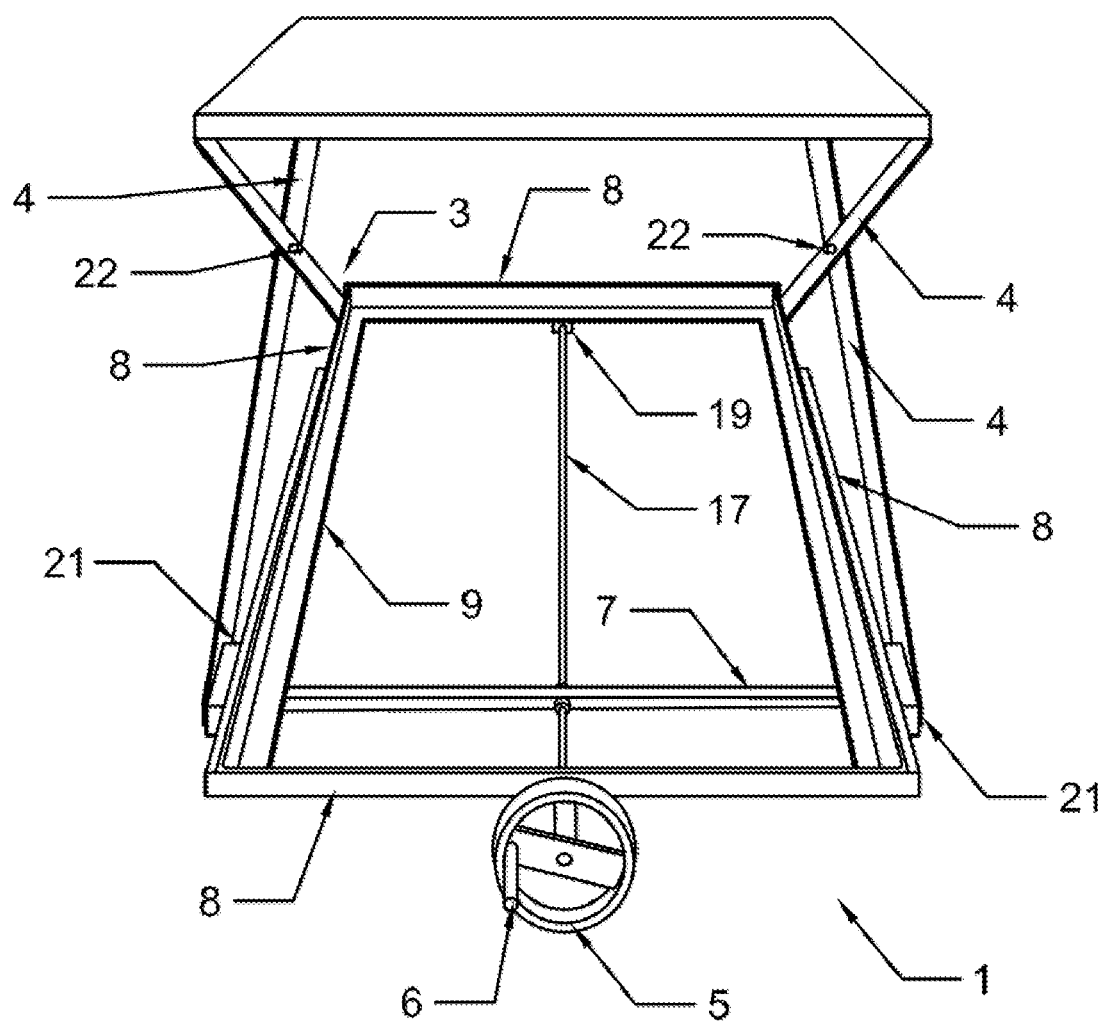
FIG. 1 is a schematic structural diagram of the storage device.
Figure 2:
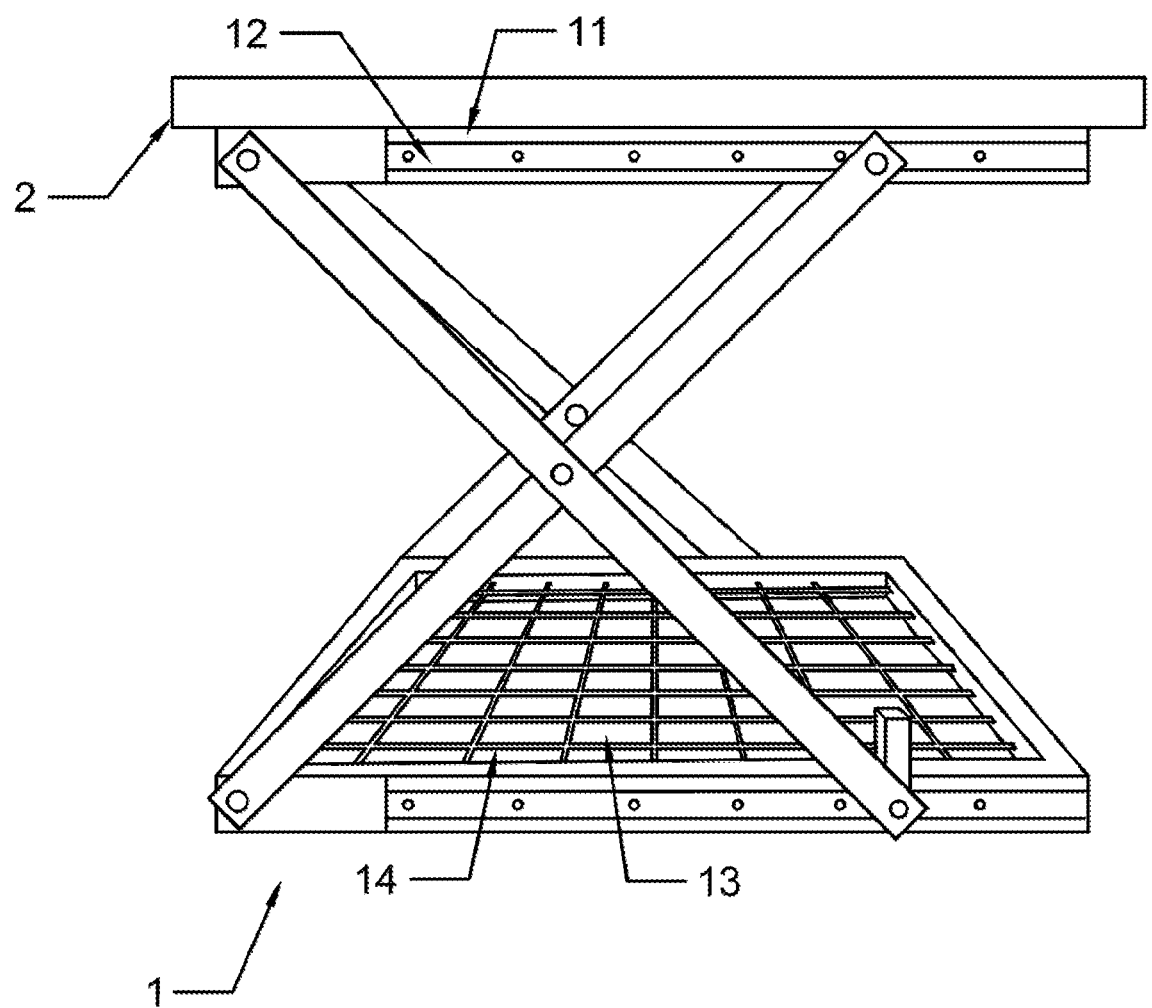
FIG. 2 is a schematic side view of the structural diagram of the storage device.
Figure 3:
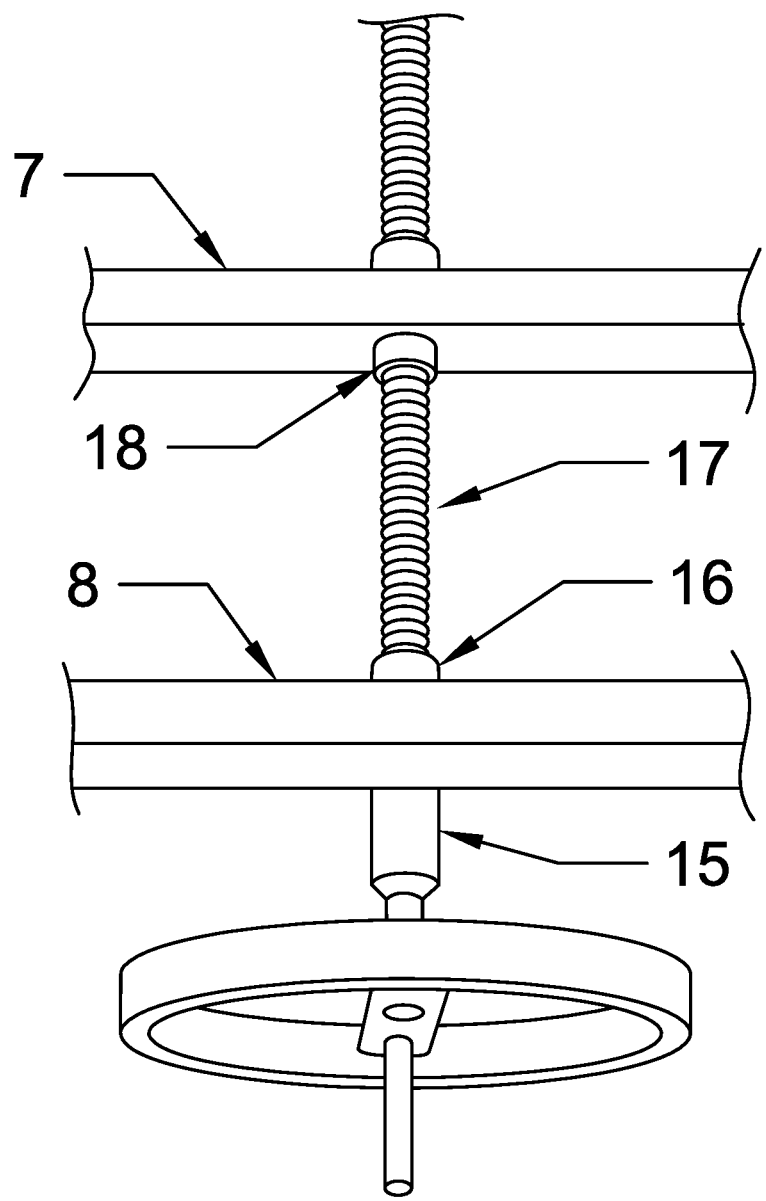
FIG. 3 is an enlarged schematic top view of the structural diagram of the storage device.
Figure 4:
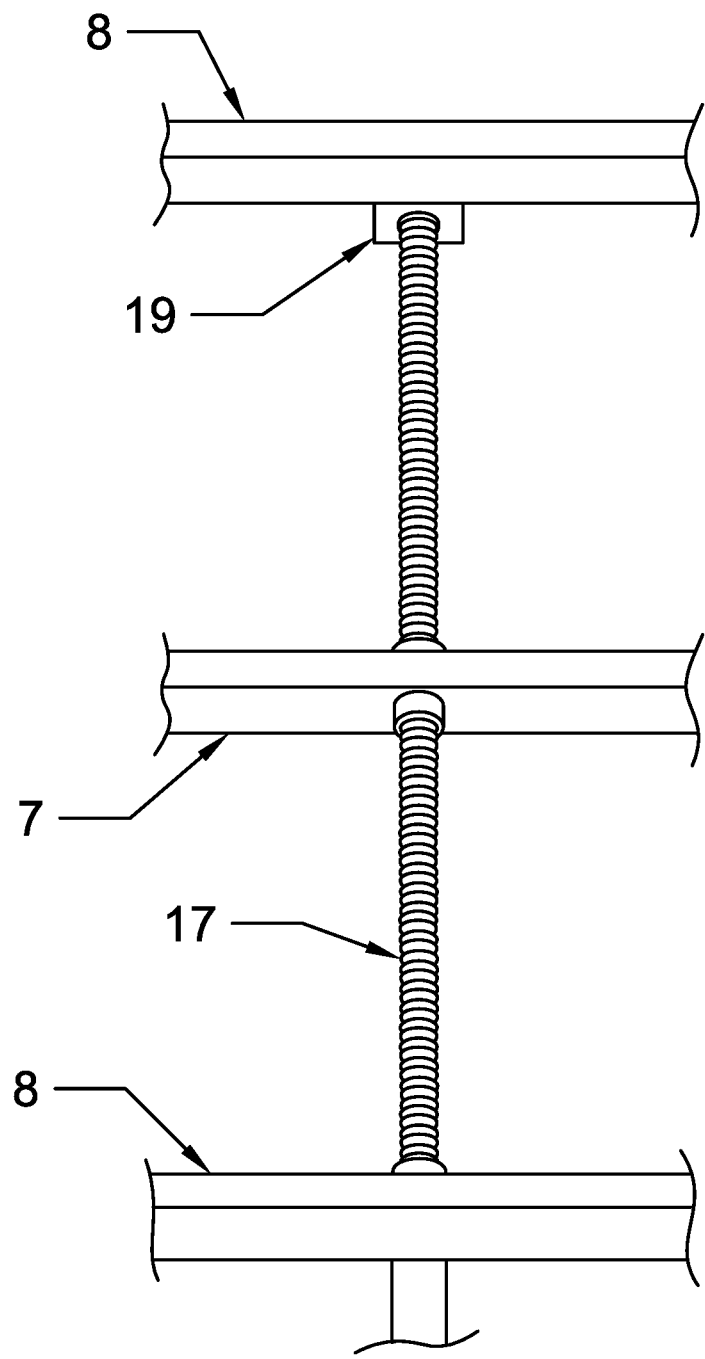
FIG. 4 is a schematic perspective view of the structural diagram of the storage device.
Figure 5:
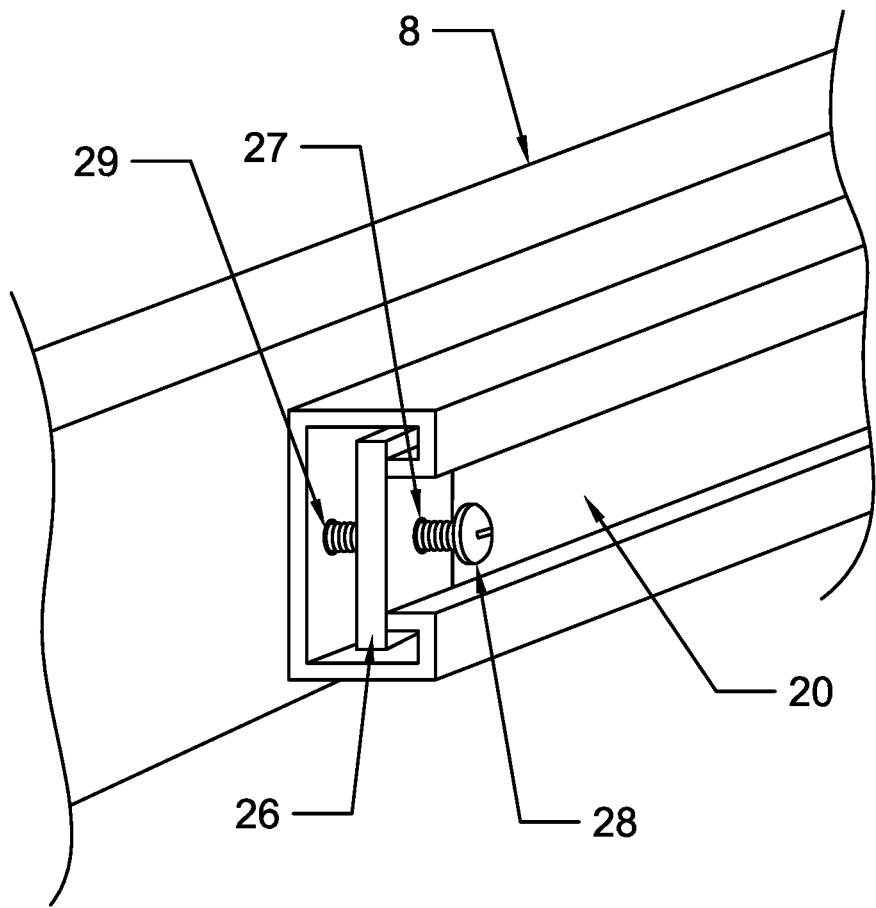
FIG. 5 is a side view of the schematic structural diagram of the storage device.
Figure 6:
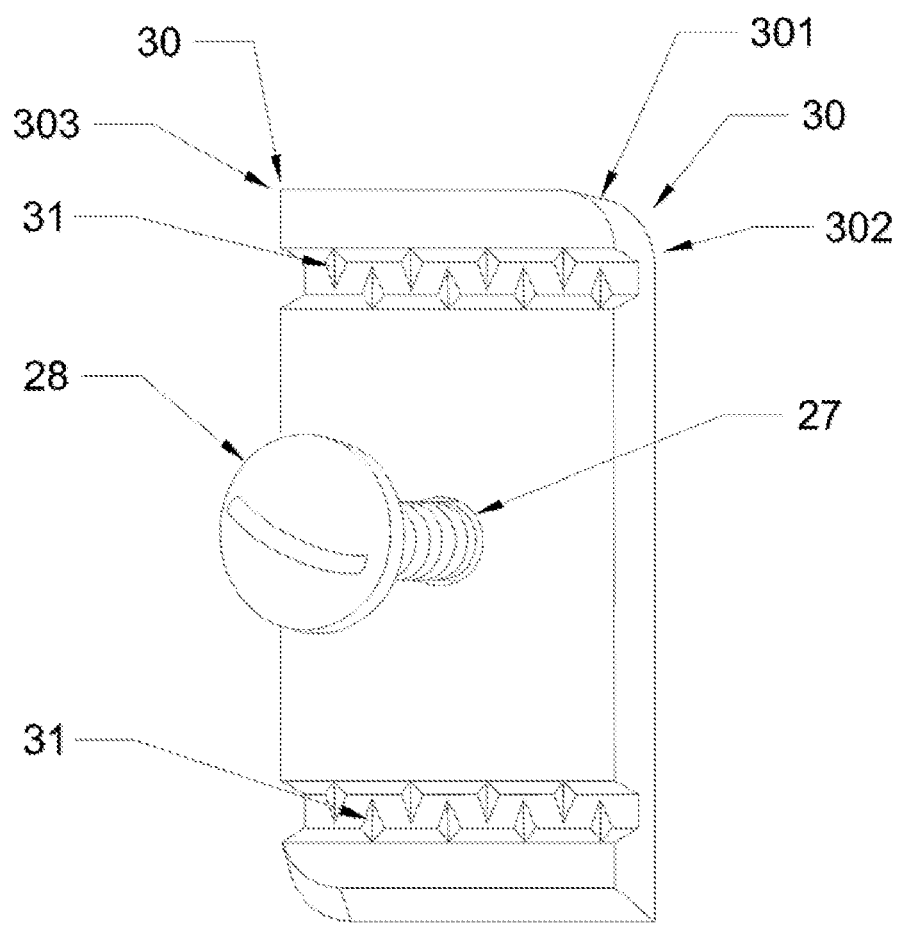
FIG. 6 is a schematic structural diagram of a stopper.
Figure 7:
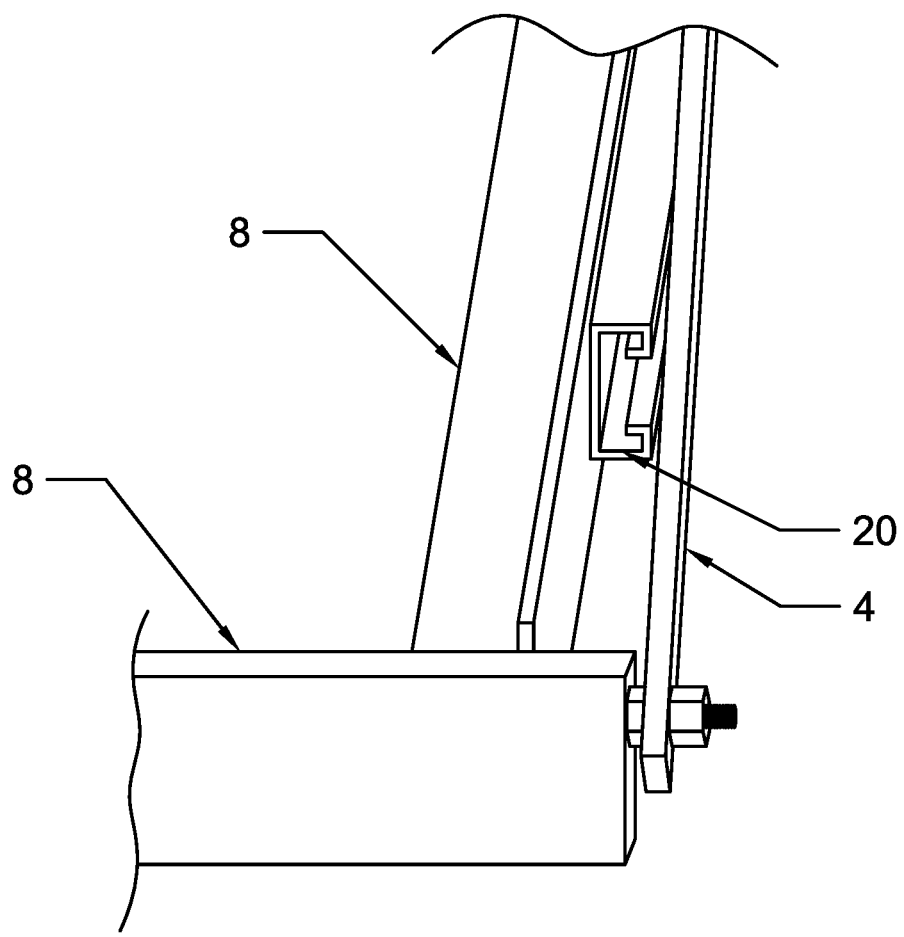
FIG. 7 is a schematic perspective view of the structural diagram of the storage device.
Figure 8:
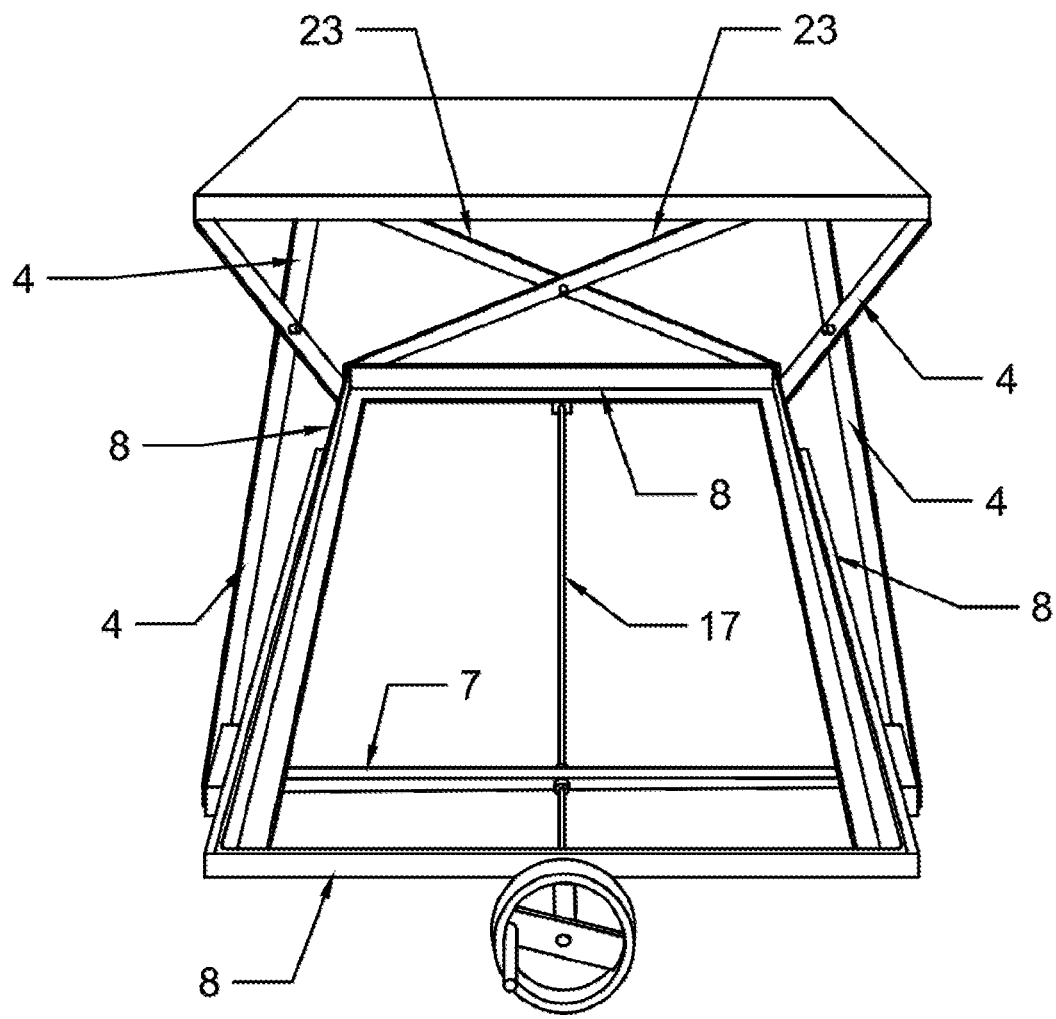
FIG. 8 is a schematic perspective top view of the structural diagram of the storage device.
Figure 9:
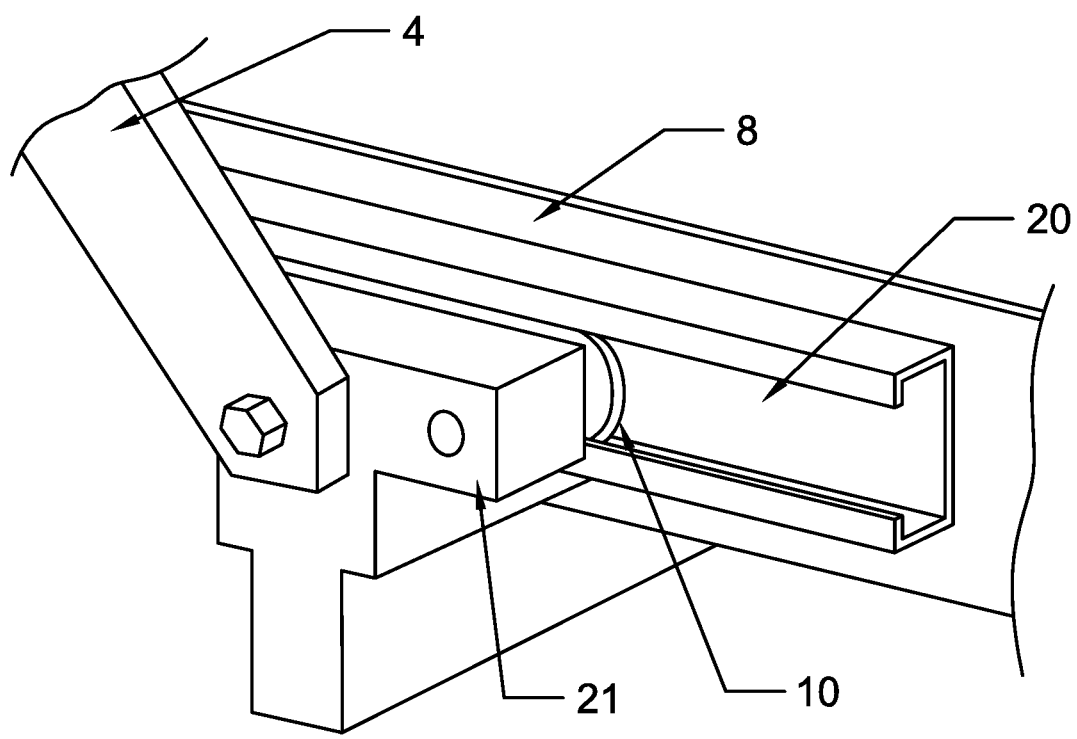
FIG. 9 is a side view of the schematic structural diagram of the storage device.
Figure 10:
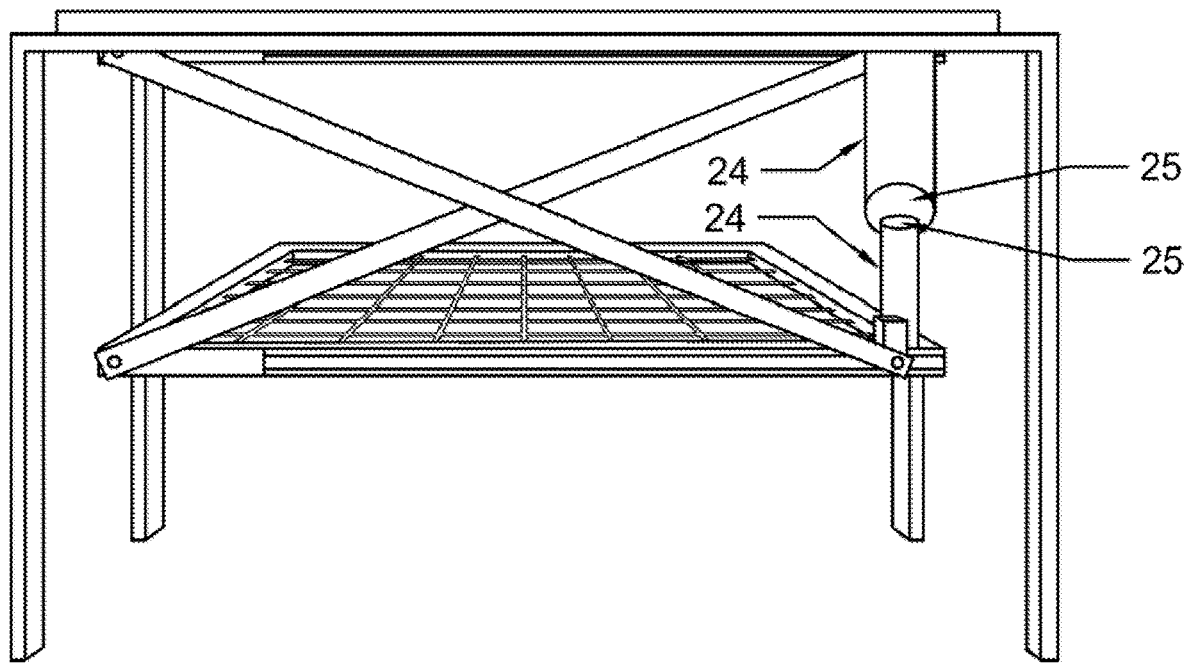
FIG. 10 is a side view of the schematic structural diagram of the storage device being partially contracted/expanded.
Figure 11:
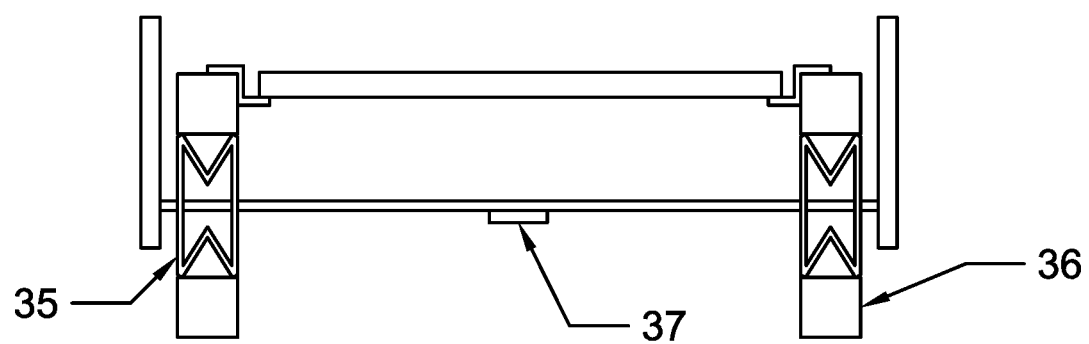
FIG. 11 is a side view of the schematic structural diagram of a wheel and tubing system of the storage device.
Figure 12:
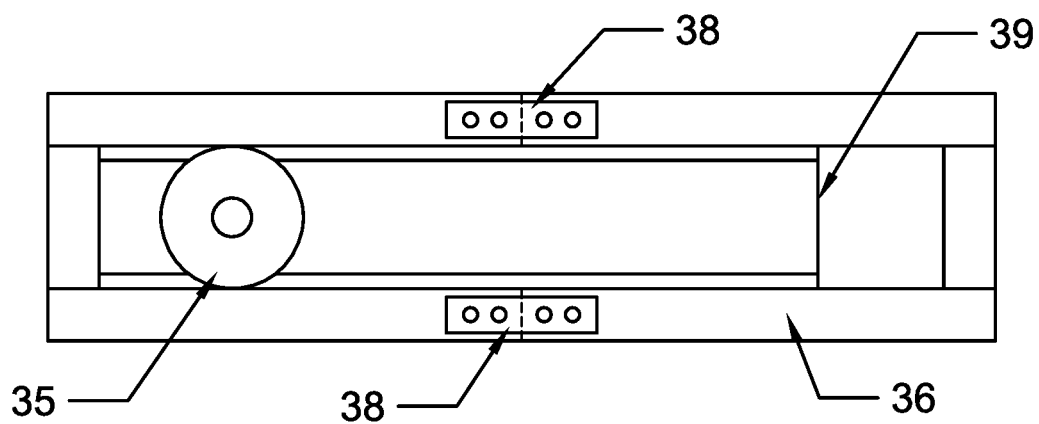
FIG. 12 is a perspective view of the schematic structural diagram of the wheel and tubing of the storage device.
Figure 13:
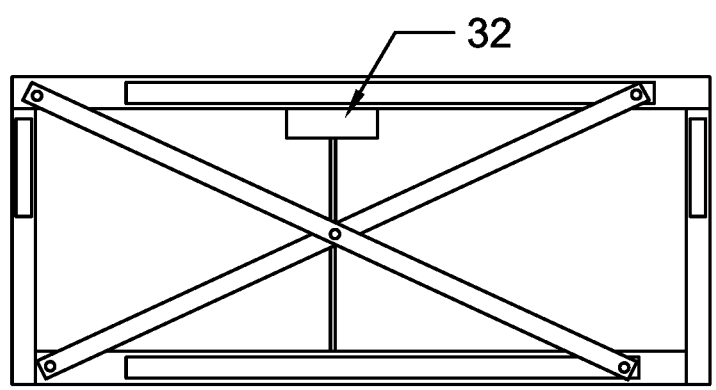
FIG. 13 is a side view of the schematic structural diagram of a winch system of the storage device.
Figure 14:
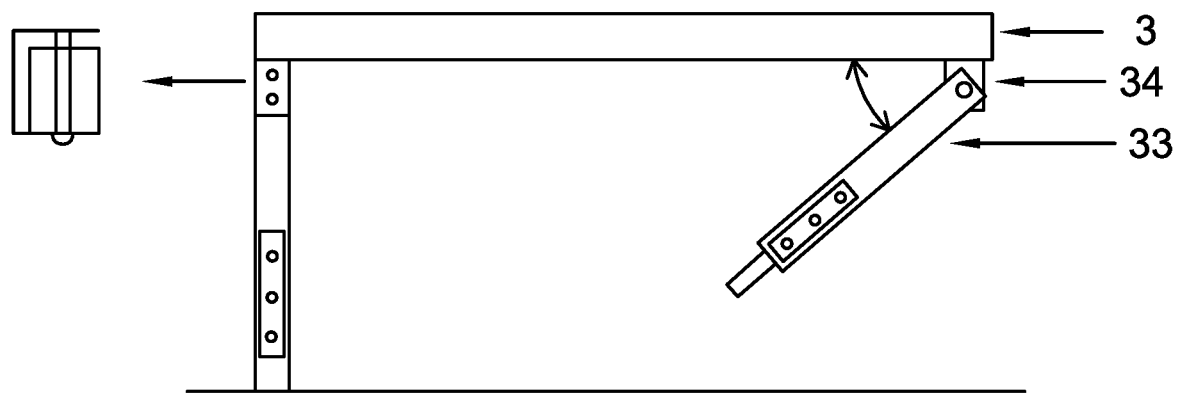
FIG. 14 is a side view of the schematic structural diagram of folding legs on the frame of the storage device.

FIGS. 1-14 illustrates the present invention where the present invention is a storage device 1 designed to be attached to a support structure 2. The support structure 2 is a roof, ceiling, joists or other similar supporting devices.

The storage device 1 comprising a frame 3, wherein the frame 3 comprises at least one elongated support element 8, a support platform connected to the frame 3 and a means for lowering and raising the frame 3.

The means for lowering and raising the frame 3 is a leveler 5, a linear actuator, a drive powered linear slide, a pulley and rope/cable system or a winch and rope/cable system. The winch system is a single winch 32 provided with a hand crank/controller or a powered crank/controller, where the winch 32 is located in the center (i.e. geometry center) of a bottom portion of the support structure 2. The leveler 5 is a wheel, a drill, a wrench or other device which can apply a force to move or rotate an element which can lower and raise the frame 3 of the storage device 1.

The storage device 1 also includes X-bars 4, a leveler 5, a movable bar 7, rolling wheel(s) 10 and two attachment guides 11. Each of the attachment guides is attached to the support structure and has a channel 12. The frame is comprised of at least one elongated support element 8, where each elongated support element 8 has a support ledge 9. The elongated support elements 8 are permanently attached or removable attached together and are attached together by a weld, screws, rivets or other fastening devices. The number of elongated support elements is preferably four but can be one or more. A support platform is placed on the support ledges. The support platform is comprised of one or more panels 13, where the panels are formed from a grid of support members 14. The support members 14 are round or square or have a similar polygonal shape; are made of steel or aluminum or any other metal or a composite metal or a composite material; and may have a spacing/gap between the support members 14. The support platform is permanently attached or removable attached to the support ledges and are attached by a weld, screws, rivets or other fastening devices. The frame is rectangular or square or some other shape. The frame material is steel or aluminum or any other metal or a composite metal or a composite material that provides the ability/strength to hold a distributed weight (i.e. distributed across the support platform) capacity from a few pounds of weight up to 800 pounds of weight or even more than 800 pounds of weight in order to support the weight of a given or desired use of the storage device. The frame is approximately four feet in width by seven feet in length. However, the width and/or the length can be shorter or longer than the disclosed four foot width and the seven foot length in order to accommodate the storage device use within a desired location and to meet the required user needs of the quantity and size of the items to be stored. Also, folding legs 33 with pivoting element(s) 34 (i.e. a groove and pin/rod) are attached to the bottom of the frame 3 and located at each of the corners of the frame 3 in order to help support the load/weight of the storage items installed on the storage device 1.

The leveler 5 is attached to a coupler 15 and the coupler 15 is connected to a bracket 16 located on an underside of an elongated support element 8. The leveler 5 is a wheel having a handle 6 attached to an outer surface of the wheel. The handle 6 is used to move/rotate the wheel in a clockwise and/or counterclockwise direction. The coupler 15 and the bracket 16 both have an internal grooved hole therein and a grooved shaft 17 is inserted into the grooved holes of the coupler 15 and the bracket 16. The connection between the coupler 15 and the bracket 16 and the attachment of the bracket 16 to the underside of the elongated support element 8 can be any known connection, either permanently connected or removably connected, method of connecting two elements together such as a weld, screws, rivets, or other fastening devices. Additionally, the grooved shaft 17 is inserted into a grooved aperture 18 located within the movable bar 7 and also is inserted into a grooved aperture located in a fitted bracket 19, where the fitted bracket 19 is attached to an underside of an elongated support element 8. The attachment of the fitted bracket 19 can be any known connection, either permanently connected or removably connected, method of connecting two elements together such as a weld, screws, rivets, or other fastening devices and methods. The elongated support element 8, which has the fitted bracket 19 attached thereto, and the elongated support element 8, which has the bracket 16 attached thereto, are located opposite to each other within the frame 3. Two of the elongated support elements 8 have an elongated U-shaped channel 20 attached to an outer surface. Preferably, the two elongated support elements 8 having the elongated U-shaped channel 20 attached thereto are located between the elongated support elements 8 which have the bracket 16 and the fitted bracket 19 attached thereto. At least one rolling wheel 10 is attached to a carriage 21 and the movable bar 7 and the at least one rolling wheel 10 is placed inside each of the elongated U-shaped channels 20 and inside each of the channels 12 of the attachment guides 11. It is preferable to have the at least one rolling wheel 10 being two rolling wheels. However, more than two rolling wheels 10 attached to the carriage 21 and placed inside each of the elongated U-shaped channels 20 and inside the channels 12 of the attachment guides 11 are applicable depending on the desired use of the storage device. The rolling wheel(s) 10 preferably contain roller bearings. The carriage 21 and movable bar 7 have a hole or holes therein and the at least one rolling wheel 10 is attached to the carriage via the hole(s) in the carriage.

Two pair of X-bars 4 attach to the storage device 1. Each X-bar has a hole therein and the hole is located at the midpoint of the length of the bar. A screw, rivet, fastener or similar fastening device 22 is installed into the holes of the X-bars in order to connect the X-bars together. The X-bars have the same length in order to keep the support platform level when lowering or raising the frame 3 by rotating the leveler 5. The X-bars 4 are flat bars. Alternatively, the X-bars 4 can be tubular (i.e. circular) shaped or square shaped or any other polygonal shape. The X-bars 4 are made from steel or aluminum or any other metal or a composite metal or a composite material. In one X-bar pair 4, one end of one of the X-bars 4 is attached to the carriage 21 (i.e. a first carriage) and the other end of the X-bar 4 is attached to one of the attachment guides 11 (i.e. a first attachment guide) and one end of the other X-bar 4 is attached to an elongated support element 8 and the other end of the other X-bar 4 is attached to the one of the attachment guides 11 (i.e. a first attachment guide). In the other pair of the two pair of the X-bars 4, one end of one X-bar 4 is connected to a carriage 21 (i.e. a second carriage) and the other end of the one X-bar 4 is connected to the other attachment guide 11 (i.e. a second attachment guide) and the other X-bar 4 has one end connected to the at least one elongated support element 8 and the other end of the other X-bar 4 is connected to the other attachment guide 11 (i.e. a second attachment guide). The attachment of the X-bars 4 to the carriages 21 (i.e. first carriage and second carriage) are attached in the same axial plane as the center of the at least one rolling wheel 10 in order to prevent moment forces.

Also, a support X-bar 23 or a pair of support X-bars 23 are attached to the support structure 2 and to the same elongated support element 8 which the fitted bracket 19 is attached in order to reduce lateral forces and therefore reduce the frame 3 from moving in a sideways direction. The support X-bar 23 or the pair of support X-bars 23 can be permanently attached or removably attached to the elongated support element 8 by any known connection method of connecting two elements together such as a weld, screws, rivets, or other fastening devices and methods.

Furthermore, in combination or not in combination with the support X-bar 23 or the pair of support X-bars 23, vertical alignment bars 24 are positioned at each corner of the frame 3 and are connected to the elongated support elements 8 and the attachment guides 11. The vertical alignment bars 24 are comprised of tubing, where the tubing has at least one opening 25 at one end thereof. The vertical alignment bars 24 are attached to each attachment guide 11 and have an opening larger than the tubes' opening 25 that are attached to the elongated support elements 8 so the tubing attached to the elongated support elements 8 fit inside the tubing attached to the attachment guides 11 in order to prevent the frame 3 from moving side to side during the lowering and raising of the frame 3. However, the size of the openings 25 of the tubing may be opposite as disclosed above. Therefore, the tubing attached to the attachment guides 11 may have an opening 25 smaller than the tubes' opening 25 attached to the elongated support elements 8 so the tubing attached to the attachment guides 11 fit inside the tubing attached to the elongated support elements 8. The tubing shape is circular shaped or square shaped or any other polygonal shape. The tubing is made from steel or aluminum or any other metal or a composite metal or a composite material. The attachment of the vertical alignment bars 24 can be permanently attached or removable attached by any known connection method of connecting two elements together such as a weld, screws, rivets, or other fastening devices and methods.

The movable bar 7 is positioned underneath two of the elongated support elements 8 of the frame 3 and has a grooved aperture therein and is attached to the carriages 21. The grooved aperture is located at the middle of the movable bars' length direction, wherein the length direction is perpendicular to the axis of the grooved shaft 17. The movable bar 7 positioned underneath the elongated support elements 8 is attached to the carriages 21 by any known connection method of connecting two elements together such as a screws, rivets, or other fastening devices and methods.

A stopper 26 is placed inside each of the elongated U-shaped channels 20 and inside each channel 12 of each of the attachment guides 11. The stopper 26 is rigid and movable. The stopper 26 has a hole 27 therein and a screw 28 is installed within the hole 27 and is installed within a stopper hole 29 located within the elongated U-shaped channels 20 and inside each channel 12 of each of the attachment guides 11. The stopper 26 has a top surface 30, where one corner of the top surface 30 is higher and is upper corner 303 which is higher than the other top surface lower corner 302 so as to allow easy removal of the stopper 26 from the inside of the elongated U-shaped channels 20 and the channels 12 of the attachment guides 11. The lower corner 302 of top surface 30 can be a rounded shape 301 to provide easier rotation/insertion/removal into and out of the channels 20. Also, stopper 26 has two rows of ridges 31 to increase the rigidity of the stopper 26. The stoppers 26 being rigid prevents the stoppers 26 from being moved when contacted by the translating carriages 21. Also, the stopper 26 being movable provides the flexibility of positioning the stopper 26 at any location within the elongated U-shaped channels 20 and the channels 12 in the attachment guides 11 so as to be able to change/design the length of the X-bars 4 as needed while without having to change (i.e. keeping fixed) the length of the elongated support elements 8 of the frame 3.

An alternative embodiment of the present invention is replacing the elongated U-shaped channels 20 and rolling wheel(s) 10 with V grooved wheel(s) 35 housed inside square tubing 36, wherein the housing includes mounting plate(s) 37, internal sleeves 38 connecting the square tubing 36 together and stop plates 39.

The operation of the storage device 1 is disclosed below. When the leveler 5 is rotated (for example by a handle 6), the moveable bar 7 moves in a horizontal direction and forces the rolling wheel(s) 10 attached to the carriages 21 and the movable bar 7 to move, which moves the X-bars 4, and this movement of the X-bars 4 either lowers or raises the fame 3 of the storage device 1. For example, if the leveler 5 is rotated in a clockwise direction, this rotation will rotate the grooved shaft 17 which forces the movable bar 7 to move in a forward direction and forces the rolling wheel(s) 10 to rotate and translate forward along the elongated U-shaped channels 20. Since the rolling wheel(s) 10 are attached to the carriages 21 and the carriages 21 are fixed to at least one of the X-bars 4, the X-bars 4 will move in an upward (i.e. vertical) direction and the frame 3 of the storage device 1 moves in a downward direction. The leveler 5 is continued to be rotated (i.e. clockwise in this example) until the frame 3 has been lowered to such a position that a user of the storage device 1 can safely place items on or remove from the panel(s) 13 of the platform of the storage device 1.

Finally, it should be noted that the above embodiments are only used to illustrate the technical aspects of the present disclosure, rather than limit the embodiments. Although the present disclosure has been described in detail with reference to the foregoing embodiments, it should be understood by a person of ordinary skill in the art that the technical aspects described in the embodiments can still be modified or equivalent substitutions can be made to some or all of the technical features and the modifications or substitutions would not change the substance of the scope of the embodiments of the present disclosure.

What is claimed is:

1. A storage device comprising a frame, wherein the frame comprises at least one elongated support element, a support platform connected to the frame and a means for lowering and raising the frame,
   wherein the storage device further comprises a movable bar, at least one rolling wheel, a first attachment guide and a second attachment guide attached to a support structure and to two pair of X-bars,
   wherein the means for lowering and raising the frame is a leveler,
   wherein the leveler is connected to a grooved shaft and
   wherein a first pair of the two pair of the X-bars has one end of one X-bar connected to a first carriage and the other end of the one X-bar is connected to the first attachment guide and the other X-bar of the first pair of X-bars has one end connected to the at least one elongated support element and the other end of the other X-bar of the first pair of X-bars is connected to the first attachment guide,
   wherein the frame is lowered or raised when the leveler is rotated.

2. The storage device according to claim 1, wherein the at least one elongated support element has a support ledge.

3. The storage device according to claim 2, wherein the support platform is comprised of one or more panel(s) and the one or more panel(s) is/are positioned on the support ledge of the at least one elongated support element.

4. The storage device according to claim 1, wherein a fitted bracket is attached to an underside of the at least one elongated support element.

5. The storage device according to claim 1, wherein a coupler and a bracket are attached to an underside of the at least one elongated support element.

6. The storage device according to claim 1, wherein the leveler is a wheel.

7. The storage device according to claim 6, wherein a handle is attached to the wheel.

8. The storage device according to claim 1, wherein vertical alignment bars are positioned at each corner of the frame and are connected to the at least one elongated support element and to the first attachment guide and the second attachment guide.

9. The storage device according to claim 8, wherein the vertical alignment bars comprise tubing, wherein the tubing connected to the first attachment guide and the second attachment guide have an opening larger than an opening in the tubing that are attached to the at least one elongated support so the tubing attached to the at least one elongated support can be inserted into the tubing connected to the first attachment guide and the second attachment guide.

10. The storage device according to claim 1, wherein the at least one elongated support element comprises four elongated support elements and two of the four elongated support elements have an elongated U-shaped channel attached to an outer surface.

11. The storage device according to claim 10, wherein each of the first attachment guide and the second attachment guide comprises a channel,
   wherein a stopper is placed inside each of the elongated U-shaped channels and inside each channel of the first attachment guide and the second attachment guide.

12. The storage device according to claim 11, wherein the stopper is rigid and movable.

13. The storage device according to claim 11, wherein the stopper has two rows of ridges.

14. The storage device according to claim 10, wherein each of the first attachment guide and the second attachment guide comprises a channel,
   wherein the at least one rolling wheel is placed inside each of the elongated U-shaped channels and each channel of the first attachment guide and the second attachment guide.

15. The storage device according to claim 1, wherein a second pair of the two pair of the X-bars has one end of one X-bar connected to a second carriage and the other end of the one X-bar of the second pair of X-bars is connected to the second attachment guide and the other X-bar of the second pair of X-bars has one end connected to the at least one elongated support element and the other end of the other X-bar of the second pair of X-bars is connected to the second attachment guide.

16. The storage device according to claim 15, wherein the movable bar is connected to the first carriage and to the second carriage.

17. The storage device according to claim 15, wherein the one end of the one X-bar connected to the first carriage and the one end of the one X-bar connected to the second carriage are attached in a same axial plane as a center of the at least one rolling wheel.

18. The storage device according to claim 1, wherein the grooved shaft is connected to the movable bar.

* * * * *